(No Model.)
W. STEVENSON.
FRUIT PITTER.
No. 457,940. Patented Aug. 18, 1891.
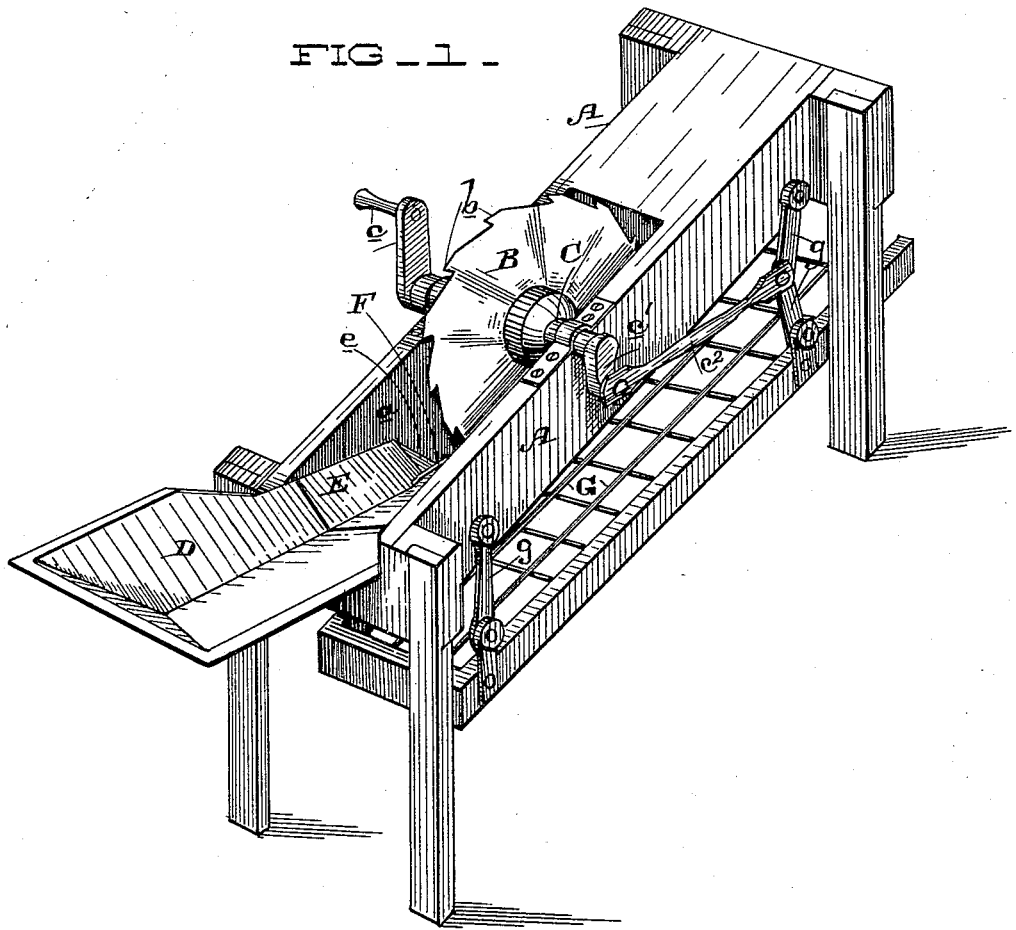
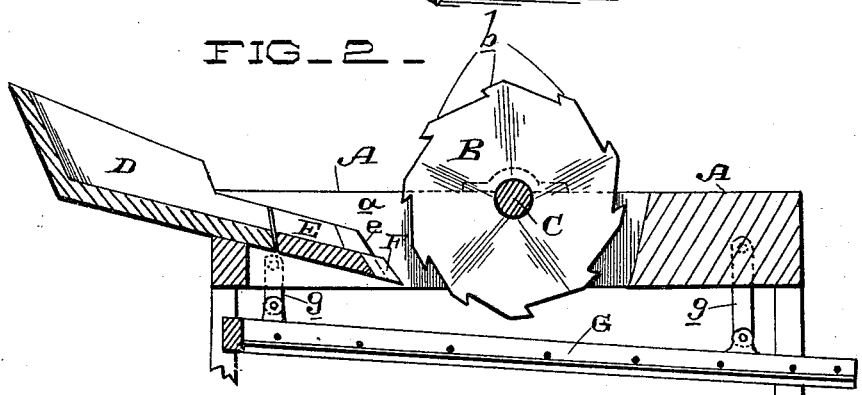
Witnesses,
Inventor,
William Stevenson
By Dewey & Co.
Att'ys
THE NORRIS PETERS CO., PHOTO-LITHO., WASHINGTON, D. C.

United States Patent Office.

WILLIAM STEVENSON, OF VALLECITO, CALIFORNIA, ASSIGNOR OF TWO-THIRDS TO LUKE SANGUINETTI, OF SAME PLACE, AND DAVID BARATINI, OF MURPHY, CALIFORNIA.

FRUIT-PITTER.

SPECIFICATION forming part of Letters Patent No. 457,940, dated August 18, 1891.

Application filed September 5, 1890. Serial No. 364,076. (No model.)

*To all whom it may concern:*

Be it known that I, WILLIAM STEVENSON, a citizen of the United States, residing at Vallecito, Calaveras county, State of California, have invented an Improvement in Fruit-Pitters; and I hereby declare the following to be a full, clear, and exact description of the same.

My invention relates to the general class of fruit-pitting machines, and especially to that class illustrated by Letters Patent of the United States No. 417,885, dated December 24, 1889, issued to Sanguinetti and Stevenson, and upon which my present machine is an improvement.

My invention consists in the novel combinations hereinafter fully described, and specifically pointed out in the claim.

The object of my invention is to provide an improved machine of this class.

Referring to the accompanying drawings for a more complete explanation of my invention, Figure 1 is a perspective view of my fruit-pitting machine. Fig. 2 is a vertical longitudinal section of the same.

A is the frame or stand of the machine having an opening $a$ in its top, in which plays a rotating cutter B, which is mounted upon a shaft C, having a crank $c$ or other means by which it is rotated. This cutter consists of a sharp disk or plate of metal having formed upon its periphery a series of thin knife-like points $b$.

D is an inclined feed-chute mounted at one end of the frame and having a V shape, as shown. This chute joins or is continued into a correspondingly-shaped inclined piece-guide E in the top of the frame, which said guide terminates in an inclined face $e$, in which is set a knife or blade F. The piece E in practice will be fitted in grooves (not shown) in the sides of the frame A, whereby it may be removed, and a similar piece of like form, but of increased or decreased length, will be substituted to accommodate the size of fruit operated upon. The piece E serves as a guide to direct the fruit properly to place, and upon its inclined face is fitted the fixed knife or blade F. This knife or blade lies in line with the cutter and is separated therefrom.

G is an inclined screen suspended by hangers $g$ from the frame and receives a vibrating motion by means of a crank $c'$ on the shaft C and a connecting-rod $c^2$.

The operation of the machine is as follows: The fruit is placed in the V-shaped feed-chute, and on account of this V shape and the corresponding V shape of the guide-piece E the fruit is fed down in the same way each time, so that each fruit will be cut uniformly in the center—that is to say, a guide is thus provided for feeding the fruit centrally to the knives. The fruit is held by the blade F, and as the cutter rotates its knife-like points cut the flesh of the fruit to the pit, so that said fruit is divided, and both the halved flesh and the pit drop upon the inclined shaking screen, through the meshes of which the pits drop, while the flesh passes down the screen into a suitable receptacle below.

Having thus described my invention, what I claim as new, and desire to secure by Letters Patent, is—

In a fruit-pitting machine, the combination of a frame or stand, the rotating cutter therein having knife-like points, the V-shaped inclined guide-piece within said frame and removably secured, whereby pieces of different lengths may be employed for fruits of different sizes, said guide-piece being located under the rotating cutter and having an inclined front $e$, and the holding-blade F, carried by said inclined front, in line with the rotary cutter, substantially as herein described.

In witness whereof I have hereunto set my hand.

WM. STEVENSON.

Witnesses:
JAS. M. STEPHENS,
JOSEPH ENNIS.